No. 795,747. PATENTED JULY 25, 1905.
C. WIRT.
RESISTANCE UNIT.
APPLICATION FILED OCT. 28, 1904.
2 SHEETS—SHEET 1.
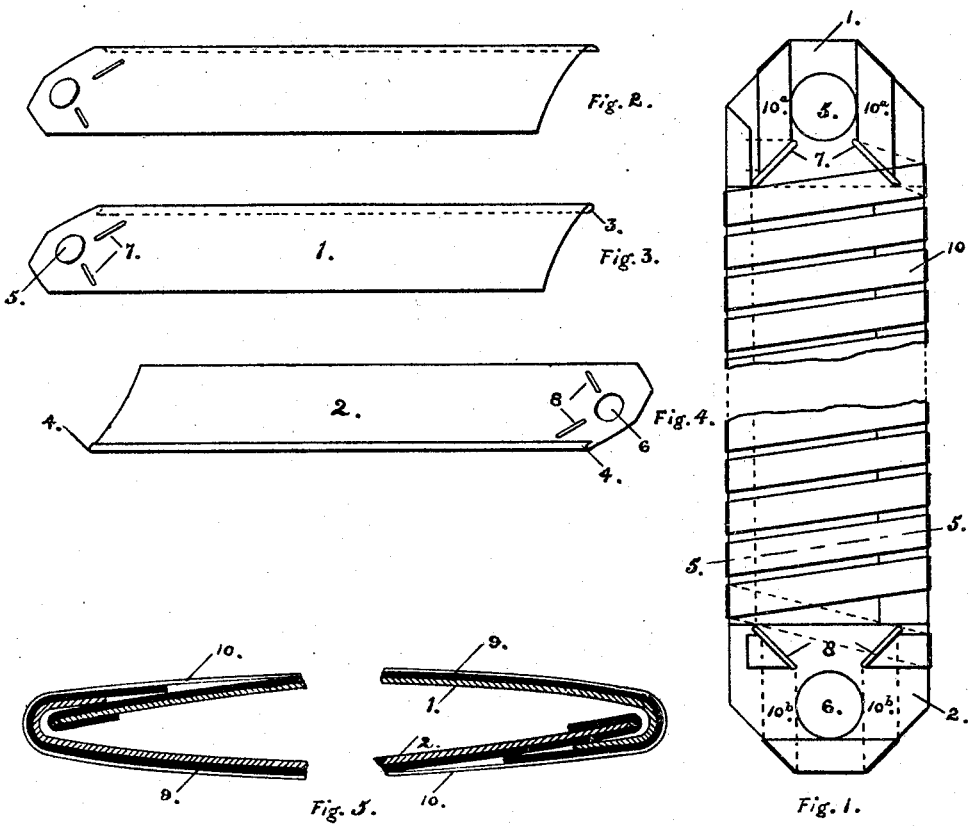
WITNESSES:
Mae Hofmann
Howard T. Okie
INVENTOR:
Charles Wirt
by Jno. T. Croasdale
Attorney No. 795,747. PATENTED JULY 25, 1905.
C. WIRT.
RESISTANCE UNIT.
APPLICATION FILED OCT. 28, 1904.
2 SHEETS—SHEET 2.
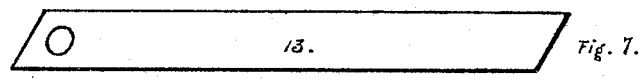
Fig. 7.
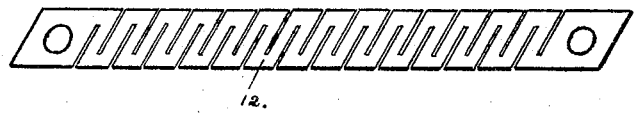
Fig. 8.
Fig. 9.
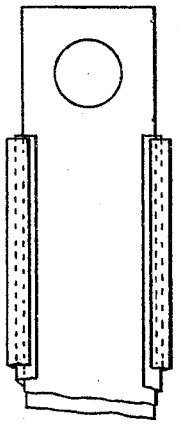
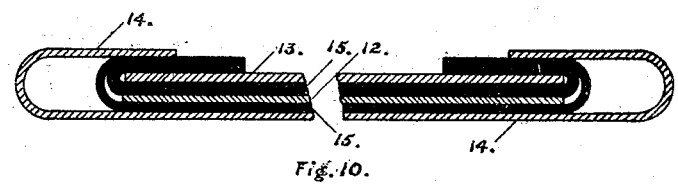
Fig. 10.
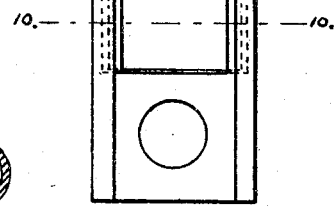
Fig. 6.
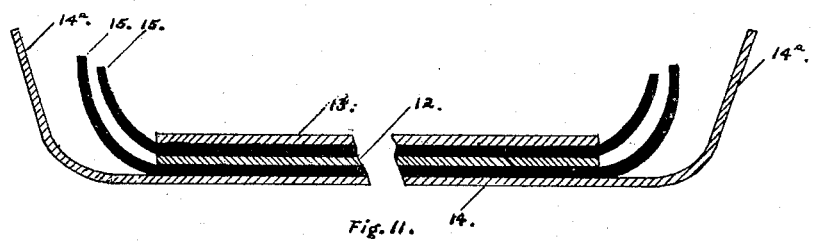
Fig. 11.
WITNESSES: INVENTOR:
Mae Hofmann Charles Wirt
Howard S. Pick by Jno. R. Teasdale
Attorney

UNITED STATES PATENT OFFICE.

CHARLES WIRT, OF GERMANTOWN, PENNSYLVANIA, ASSIGNOR TO THE WIRT ELECTRIC COMPANY INCORPORATED, A CORPORATION OF DELAWARE.

RESISTANCE UNIT.

No. 795,747.            Specification of Letters Patent.            Patented July 25, 1905.

Application filed October 28, 1904. Serial No. 230,384.

*To all whom it may concern:*

Be it known that I, CHARLES WIRT, a citizen of the United States, residing at Germantown, in the county of Philadelphia and State of Pennsylvania, have invented a new and useful Resistance Unit, of which the following is a specification.

My invention relates to improvements in resistance units for rheostats, electric heaters, and the like, my object being to provide improved means for connecting and supporting the flexible resistance.

My invention also comprises means whereby the resistance, which is flexible or non-self-supportable, shall be supported and protected against breakage or injury, and so that it shall have a maximum surface for radiation and convection.

Referring to the drawings, Figure 1 is a plan view of my resistance unit completed. Fig. 2 is a view of one of the supporting members in the preliminary state of its construction—that is, before the engaging flange is turned. Fig. 3 is an outside view of a similar supporting member with a flange fully turned. Fig. 4 is an inside view of the same or a coöperating member. Fig. 5 is a cross-section on line 5 5 of Fig. 1, but on an enlarged scale. Fig. 6 is a view of a modification of said unit having features, however, in common with that shown in Fig. 1. Fig. 7 is one of the supporting-plates for the resistance. Fig. 8 is the resistance element itself. Fig. 9 is the other or surrounding supporting-plate with the flange turned over to engage the said plate shown in Fig. 7. Fig. 10 is a cross-section on line 10 10 of Fig. 6, the view, however, being enlarged. Fig. 11 is a view similar to Fig. 10, with the various elements in the preliminary position for assembling and before the embracing flange of the outside member has been bent into place.

Similar numerals refer to similar parts throughout the several views.

As above stated, my object is to form cheap, simple, and durable means for supporting and connecting a light, thin, flexible, or otherwise non-self-supportable resistance, so that the same is not in danger of being broken or otherwise injured, and so that the same shall lie against a large surface preferably ventilated for efficient radiation and convection. Fig. 1 shows such a resistance unit assembled. This unit is composed of two plates 1 and 2, provided with the flanges 3 and 4, which are adapted to overlap each the opposite edge of the other plate, respectively. The end of one plate is adapted to project beyond the other plate in opposite directions. The projecting ends are each provided with the circular apertures 5 and 6 and the narrow apertures or slits 7 and 8, respectively, for the purpose hereinafter to be described. Each element or plate is now covered upon one side with a flexible insulating material, such as asbestos paper, the same being bent around the free side of each plate 1 and 2 before it is engaged in the overlapping flanges 3 and 4 of the opposite plates, so that when said free sides of plates 1 and 2 are engaged by the opposite flange of the other plate the insulating-paper will be securely locked into place. The insulating-paper, which I indicate by the numeral 9 in Fig. 5, is securely locked between the plates 1 and 2 and serves to insulate effectively one plate from the other. It will also be noted that in the position shown in Fig. 5 the two plates 1 and 2 when thus secured together leave an air-space between the same. A form is thus constructed upon which the resistance is wound. This resistance may be, for instance, a thin metallic ribbon, (indicated by 10 in Figs. 1 and 5,) which is wound spirally about the form from one end to the other. This ribbon 10 passes through one of slits 7 of plate 1 and then over the top, around the back, and back through the other slit 7, thus leaving two parallel strips $10^a$ embracing the circular opening 5 of member 1. Similarly the ribbon 10 passes through the slit-openings 8 of member 2 and forms on the outside of said member two parallel strips $10^b$ on either side of opening 6. It will thus be seen that a conducting-washer may join the resistance at $10^a$ with a similar resistance on an adjoining unit, while a conducting-washer may serve to connect the strips $10^b$ with the resistance of an adjoining unit on the other side. A series of said units may be secured together by tension-bolts passing through the apertures 5 and 6. Where these units are held in the vertical position, as shown in Fig. 1, it is obvious that the hollow openings between plates 1 and 2 of each unit serve as flues for the ventilation and cooling of the said units. Another advantage of the form of construction shown in Figs. 1 to 5, inclusive, is that a smooth convex surface is provided for winding the resistance without sharp corners or angles, and by having the sides convex, as indicated, it is possible to secure the winding of the resistance so that the same will lie close when applied under tension, causing such intimate contact between the resistance and the supporting-body as to facilitate the heat loss therefrom. It is obvious that when a series of units are bolted together to form a resistance or heater proper conducting-washers may be placed between the ends at which it is desired to couple any two units, while insulating-washers may be placed between the ends which it is desired to insulate. It is also obvious that by making the supporting members in convex form, as shown in Fig. 5, thereby giving the unit an elliptical cross-section, the rigidity and pressure-resisting power of said support are greatly increased.

In Figs. 6 to 11, inclusive, I show a form of construction of resistance and supporting means somewhat different from that shown in Figs. 1 to 5, but having several features and advantages in common. The unit shown in Fig. 6 is composed of a flexible resistance-strip 12—such, for instance, as is shown in Fig. 8. This strip 12 is shown with alternate oppositely-disposed slits to produce a folded or overlapping metallic path or zigzag circuit. The value may, however, be varied in other ways—for instance, by varying the thickness of the strip or the nature of the material of which the resistance is composed. This resistance-strip 12 is placed between the plates 13 and 14, 14 being flanged on either side to embrace plate 13 after insulating material, such as asbestos paper or mica, has been placed between the resistance-strip 12 and said plates 13 and 14. This is best shown in Fig. 10. Fig. 11 shows the said elements in the preliminary position before the bending over of the flanges 14ª of plate 14. In this construction the insulation between plates 12, 13, and 14 is such that one end of 12 comes into electrical contact with one end of 14, while the other end of 12 comes into electrical contact with one end of 13 at the opposite end of the resistance unit—that is, the current to pass from 13 to 14 must first pass through approximately the length of resistance 12. By means of tension-bolts and suitable conducting and insulating washers a number of such resistance units may be coupled together, as indicated with respect to the form of device shown and described in connection with Figs. 1 to 5. It will thus be seen that this unit has, in common with the unit above described, the advantage of affording means for cheap and substantial support, maximum surface for effective radiation and convection, and protection of the resistance element, which may in this case even be superior to that shown in the first five figures, for where the resistance is entirely covered and inclosed it is protected from the atmosphere. By this simple means for so protecting the resistance by two plates embracing either side and insulated from each other, said plates being electrically alive, although not actually carrying current, several advantages result—simplicity in construction, ease of connecting, supporting, and assembling a number of elements, and protection of the insulation. Such a resistance unit is practically as simple to handle as an ordinary resistance-casting; but when constructed in accordance with my invention it has the advantage over the latter of being unbreakable and is adaptable for a wide range of resistance, running much higher in ohmic resistance than it is possible to produce in a casting. To vary the resistance, I vary the thickness of the strip, or, if required, I may cut slits in the strip to produce a zigzag circuit, or flexible sheet-carbon may be used with the ends electroplated or otherwise reinforced. In fact, any form of resistance which may be produced in a flexible sheet or strip shape is adapted for use with my improved means for supporting and assembling. The resistance being inclosed from the atmosphere is protected against oxidation, for which reason a thinner resistance-strip may be used than would otherwise be safe. The resistance-strip being in intimate contact with the support, although insulated from the latter throughout most of its length, parts readily with its heat to the support, and therefore a larger surface of the latter is made effective for radiation and convection, thus permitting the use of a smaller area in the resistance itself. By this means I am able to reduce the weight of the more expensive resistance-strip to a minimum by correspondingly increasing the surface of the cheaper support, using for the latter, for example, common sheet-iron.

What I claim is—

1. A support for a flexible resistance consisting of two members insulated from each other and from the flexible resistance except where the latter is in contact at its ends respectively with one end of each of said supports.

2. A support for a flexible resistance formed of two sheet-metal elements with overturned edges adapted to engage and support each to each.

3. A support or stiffener for a flexible resistance made in two insulated parts with ends extended and formed with slots adapted to hold the ends of said resistance.

4. A support or stiffener for a flexible resistance made in two insulated parts with ends extended and formed with slots for engaging the opposite ends of the resistance, said sections embracing and forming a longitudinally-extending air-passage.

5. An electrical unit comprising a flexible resistance, an insulated support therefor, said resistance having its ends doubled into a rectangular pattern adapted to contact with connecting-washers.

6. The combination of a flexible electrical resistance, a pair of supporting elements therefor, secured together and insulated from each other and insulated from the greater part of the resistance, said resistance connected at its two ends respectively with opposite ends of the supporting elements and conducting-washers for coupling a series of units.

7. In a resistance unit, the combination of a flexible resistance, a support therefor, comprising two members insulated from each other and from the greater part of the flexible resistance, one end of the resistance being electrically connected with one end of one of the supporting members while the other end is electrically connected with the other end of the supporting members.

8. In a resistance unit, the combination of a flexible resistance, a support therefor, comprising sheet-metal elements insulated from each other and means for electrically connecting the resistance, one end with one supporting element and the other end with the other supporting element.

9. In a resistance unit, the combination of a flexible resistance and a support therefor comprising sheet-metal elements, insulated from each other and embracing a longitudinally-extending air-passage.

10. In a resistance unit, the combination of a flexible resistance and a support therefor comprising flanged sheet-metal elements insulated from each other.

11. In a resistance unit, the combination of a flexible resistance and a support therefor having an elliptical cross-section comprising sheet-metal elements insulated from each other.

12. In a resistance unit, the combination of a flexible resistance and a support therefor comprising coöperating flanged sheet-metal elements insulated from each other.

13. In a resistance unit, the combination of a resistance element and supporting and inclosing means therefor comprising insulated coöperating sheet-metal elements, and means for electrically connecting the ends of the resistance one with one supporting element and one with the other supporting element but at opposite ends of the unit.

14. In a resistance unit, the combination of a resistance element and supporting and inclosing means therefor comprising insulated sheet-metal elements having flanged coöperation with each other and means for electrically connecting the resistance with said supporting means so as to secure the passage of the current through the resistance from one supporting element to the other.

15. In a resistance unit, the combination of a resistance element, supporting and inclosing means therefor comprising coöperating sheet-metal elements, insulating-sheets between said elements and the resistance and flange means connected with said metal elements for securing the same and the insulating-sheets together.

16. In a resistance unit, the combination of a resistance element and supporting and inclosing means therefor comprising insulated coöperating sheet-metal elements embracing a longitudinally-extending air-passage.

17. In a resistance unit, the combination of a resistance element, supporting and inclosing means therefor comprising coöperating sheet-metal elements, insulating-sheets between said elements and the resistance and flange means connected with said metal elements for securing the same and the insulating-sheets together, said metal elements being so disposed as to provide and embrace a longitudinally-extending air-passage.

CHARLES WIRT.

Witnesses:
MAE HOFMANN,
EUGENE ZIEGLER.